(12) United States Patent
Meguro

(10) Patent No.: US 6,801,074 B2
(45) Date of Patent: Oct. 5, 2004

(54) CLOCK SWITCHING CIRCUIT (75) Inventor: Tetsumasa Meguro, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/618,726

(22) Filed: Jul. 15, 2003

(65) Prior Publication Data
US 2004/0012435 A1 Jan. 22, 2004

(30) Foreign Application Priority Data
Jul. 16, 2002 (JP) .................................... P2002-207210

(51) Int. Cl.⁷ .............................................. G06F 1/04
(52) U.S. Cl. ........................................ 327/298; 327/99
(58) Field of Search ................................ 327/291–299, 327/99, 161; 375/357; 326/93–98

(56) References Cited

U.S. PATENT DOCUMENTS

| | | | | |
|---|---|---|---|---|
| 5,083,049 A | * | 1/1992 | Kagey | ........................ 327/141 |
| 5,274,678 A | * | 12/1993 | Ferolito et al. | ............. 375/357 |
| 5,289,050 A | * | 2/1994 | Ogasawara | .................. 327/141 |
| 5,623,223 A | * | 4/1997 | Pasqualini | ................... 327/298 |
| 6,600,355 B1 | * | 7/2003 | Nguyen | ....................... 327/298 |
| 2003/0001612 A1 | * | 1/2003 | Menezes et al. | ............... 326/37 |

* cited by examiner

Primary Examiner—Minh Nguyen
(74) Attorney, Agent, or Firm—Rader, Fishman & Grauer PLLC; Ronald P. Kananen (57) ABSTRACT A clock switching circuit is provided for switching from a first clock signal being output to a freely selected second clock signal among a plurality of clock signals having different frequencies and phases while preventing generation of a hazard. The switching circuit has a plurality of unit circuits for respectively receiving as an input the clock signals, selection signals of the clock signals and enabling signals and controls supplying and stopping of the clock signals in accordance with the selection signals and the enabling signals. A feedback circuit monitors output conditions of the plurality of unit circuits and, when outputting of all clock signals of the plurality of unit circuits was stopped as a result of stopping the first clock signal, giving a plurality of the unit circuits the enabling signal for approving starting of a supply of the second clock signal.

19 Claims, 8 Drawing Sheets

CLOCK SWITCHING CIRCUIT

BACKGROUND OF THE INVENTION

1. Field of the Invention

The present invention relates to a clock switching circuit for switching a clock signal to be output from a first clock signal to a second clock signal in accordance with a selection signal when outputting a first clock signal selected from a plurality of clock signals.

2. Description of the Related Art

A power consumption of an LSI is proportional to a frequency of a clock signal for operating the LSI. Thus, there is known a method of switching the clock frequency in accordance with an operation condition of the LSI, such as switching to a clock having a lower frequency when a load on the LSI is small.

FIGS. 8A to 8E are timing charts of a general operation in a clock switching method.

Figure 8A:
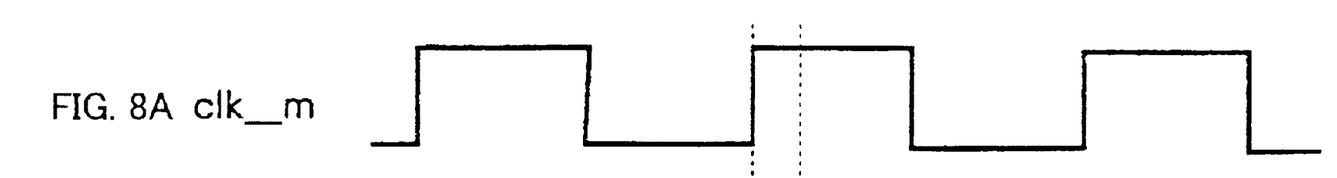
Figures 8B, 8C, 8D:
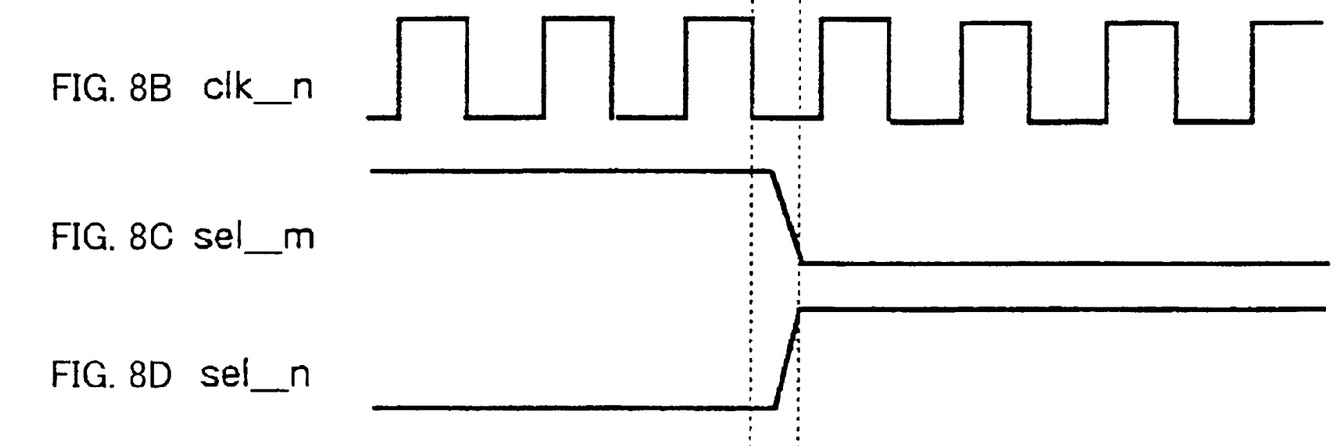
Figure 8E:
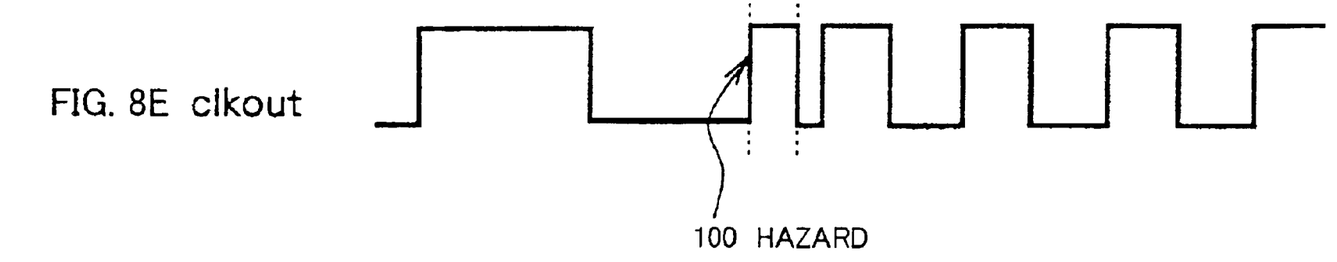

A clock signal "clkout" to be supplied to an LSI is generated by selecting one of two clock signals "clk_m" and "clk_n" having different frequencies. FIG. 8A is a waveform of the clock signal "clk_m", FIG. 8B is a waveform of the clock signal "clk_n" and FIG. 8E is a waveform of the clock signal "clkout". FIGS. 8C and 8D are waveforms of selection signals of the clock signals.

The clock signal "clk_m" is selected when the selection signal "sel_m" is at "H" and the clock signal "clk_n" is selected when the selection signal "sel_n" is at "H".

Depending on a phase relationship of the clock signal and selection signal, a hazard 100 is liable to be generated as shown in FIG. 8E. When the hazard 100 is generated, it is likely that the LSI operates erroneously, so that it is necessary that a clock switching circuit have a technique to prevent generation of a hazard.

A multi-phase clock generation circuit described in the Japanese Patent Unexamined Publication No. 2001-177510 has the PLL configuration to be controlled to have the same frequency with an operation frequency of an input data signal. Thus, a plurality of clock signals having the same frequency, a constant phase difference and different phases are output from the multi-phase clock generation circuit. Selection signals in synchronization with the plurality of clock signals are generated and the selection signals are latched by the plurality of clock signals in the selection control circuit and output to a selector for switching the clock signals. In the selector, switching of the clock signals is performed at a timing when levels of two clock signals to be switched are matched. As a result, switching of clock signals at any time without generating a hazard is realized in the technique described in the above publication.

In the technique described in the above publication, however, an oscillator for generating a reference clock signal having the same frequency with that of an input data signal is built-in in the multi-phase clock generation circuit, and a plurality of clock signals having an identical frequency and different phases are generated based on the reference clock. Accordingly, a method of switching clock signals described in the above publication cannot be applied to a plurality of clock signals having different frequencies and phases, such as a plurality of clock signals generated from a plurality of PLL circuits.

SUMMARY OF THE INVENTION

An object of the present invention is to newly provide a clock switching circuit for switching a first clock signal being output to a freely selected second clock signal among a plurality of clock signals having different frequencies and phases while preventing generation of a hazard.

To attain the above object, according to the present invention, there is provided a clock switching circuit for receiving as an input a plurality of clock signals including first and second clock signals and switching one clock signal to be output from the first clock signal to the second clock signal, comprising a plurality of unit circuits for respectively receiving as an input the clock signals, selection signals of the clock signals and enabling signals and controlling supplying and stopping of the clock signals in accordance with the selection signals and the enabling signals; and a feedback circuit for monitoring output conditions of the plurality of unit circuits and, when outputting of all clock signals of the plurality of unit circuits was stopped as a result of stopping the first clock signal, giving a plurality of the unit circuits the enabling signals for approving starting of a supply of the second clock signal.

Assuming that in accordance with a selection signal input to a unit circuit corresponding to a first clock signal, the first clock signal is output from the unit circuit. At this time, another unit circuit corresponding to a second clock signal does not output a clock signal. Next, logic states (voltage levels) of two selection signals of the two are inversed and an instruction that a clock signal to be output is switched from the first clock signal to the second clock signal is given. The unit circuit outputting the first clock signal stops outputting the first clock signal. A feedback circuit detects that the first clock signal is stopped and gives an enabling signal to the above plurality of unit circuits. A unit circuit corresponding to the second clock signal starts to supply the second clock signal due to an input of the enabling signal.

BRIEF DESCRIPTION OF DRAWINGS

FIG. 3A to FIG. 3J are timing charts of a clock switching operation in the first embodiment;

FIG. 8A to FIG. 8E are timing charts of a general operation in a clock switching method.

DESCRIPTION OF THE PREFERRED EMBODIMENT

Embodiments of the present invention relates to a clock switching circuit for generating an output clock without a hazard at the time of selecting one from a plurality of clock signals by stopping a clock signal being selected and, after going through a condition that all clocks are stopped, starting a supply of a clock signal to be selected next.

First Embodiment

Figure 1:
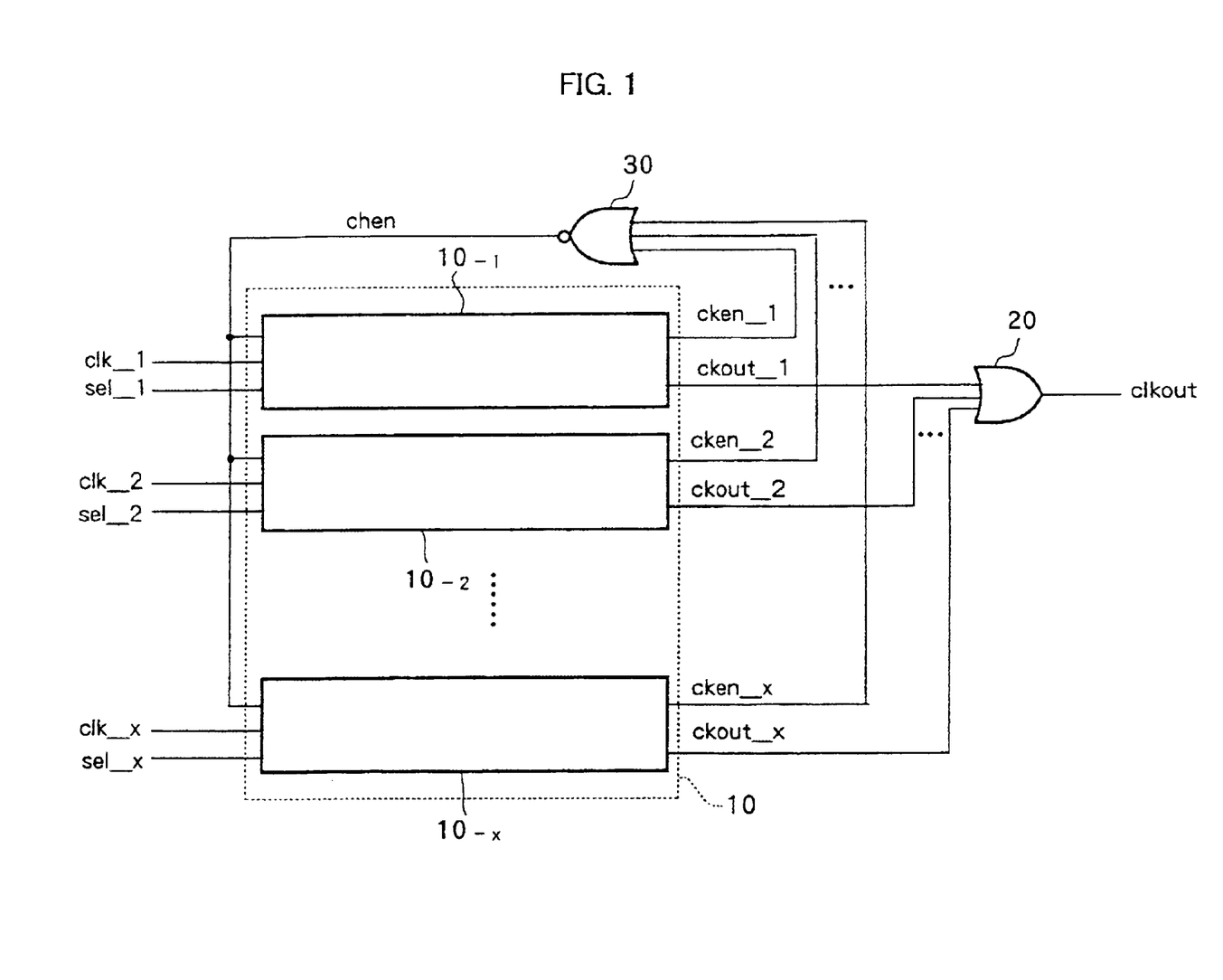
FIG. 1 is a block diagram of a clock switching circuit according to a first embodiment.

FIG. 1 is a block diagram of a clock switching circuit in a first embodiment.

The clock switching circuit illustrated in FIG. 1 comprises a clock selection circuit 10 for selecting outputting one among a plurality of clock signals. The clock selection circuit 10 comprises a plurality of unit circuits 10-1, 10-2, . . . , 10-x, the number of which corresponds to the number of clock signals to be input. The unit circuit 10-1 receives a clock signal "clk_1" and a selection signal "sel_1", the unit circuit 10-2 receives a clock signal "clk_2" and a selection signal "sel_2", and the unit circuit 10-x receives a clock signal "clk_x" and a selection signal "sel_x". Each of the unit circuits outputs the input clock signal when the selection signal is active, and during other times, serves as a control circuit for supplying and stopping of the clock signal for stopping outputting of the clock signal.

The input clock signals "clk_1", "clk_2", "clk_x" may be those generated from one reference clock signal by dividing at different dividing ratios. Alternately, clock signals individually generated by a plurality of different PLL circuits or oscillators may be also used. In other words, the case where phases and frequencies of clock signals are not completely uniform may be applied.

In order to select one clock, one of the selection signals "sel_1", "sel_2", . . . "sel_x" becomes at a "H" level and other selection signals become "L" level.

All of output terminals of the clock signals of the unit circuits 10-1, 10-2, . . . 10-x are connected to an input of an output circuit 20. In FIG. 1, selected clock signals are indicated by references "ckout_1", "ckout_2", . . . "ckout_x". Also, as the output circuit 20, an OR gate is provided for receiving as inputs the selected signals "ckout_1", "ckout_2", . . . "ckout_x" and outputting an output clock signal "clkout" as a logical sum of the input signals.

Each of the unit circuits is provided with an input terminal for a clock supply enabling signal "chen". Also, the unit circuits 10-1, 10-2, . . . 10-x are respectively provided with an output condition monitor terminal on the output side thereof.

A feedback circuit 30 is provided between all monitor terminals and all input terminals for enabling signals of the respective unit circuits 10-1, 10-2, 10-x. The feedback circuit 30 shown in FIG. 1 is a NOR gate. The feedback circuit 30 receives output condition monitor signals "cken_1", "cken_2", . . . "cken_x" of the respective unit circuits 10-1, 10-2, . . . 10-x and, when it is confirmed in all of the monitor signals that outputting of clock signals is stopped, supplies the above clock supply enabling signal "chen" to all of the unit circuits.

The configuration of the respective unit circuits is identical.

Figure 2:
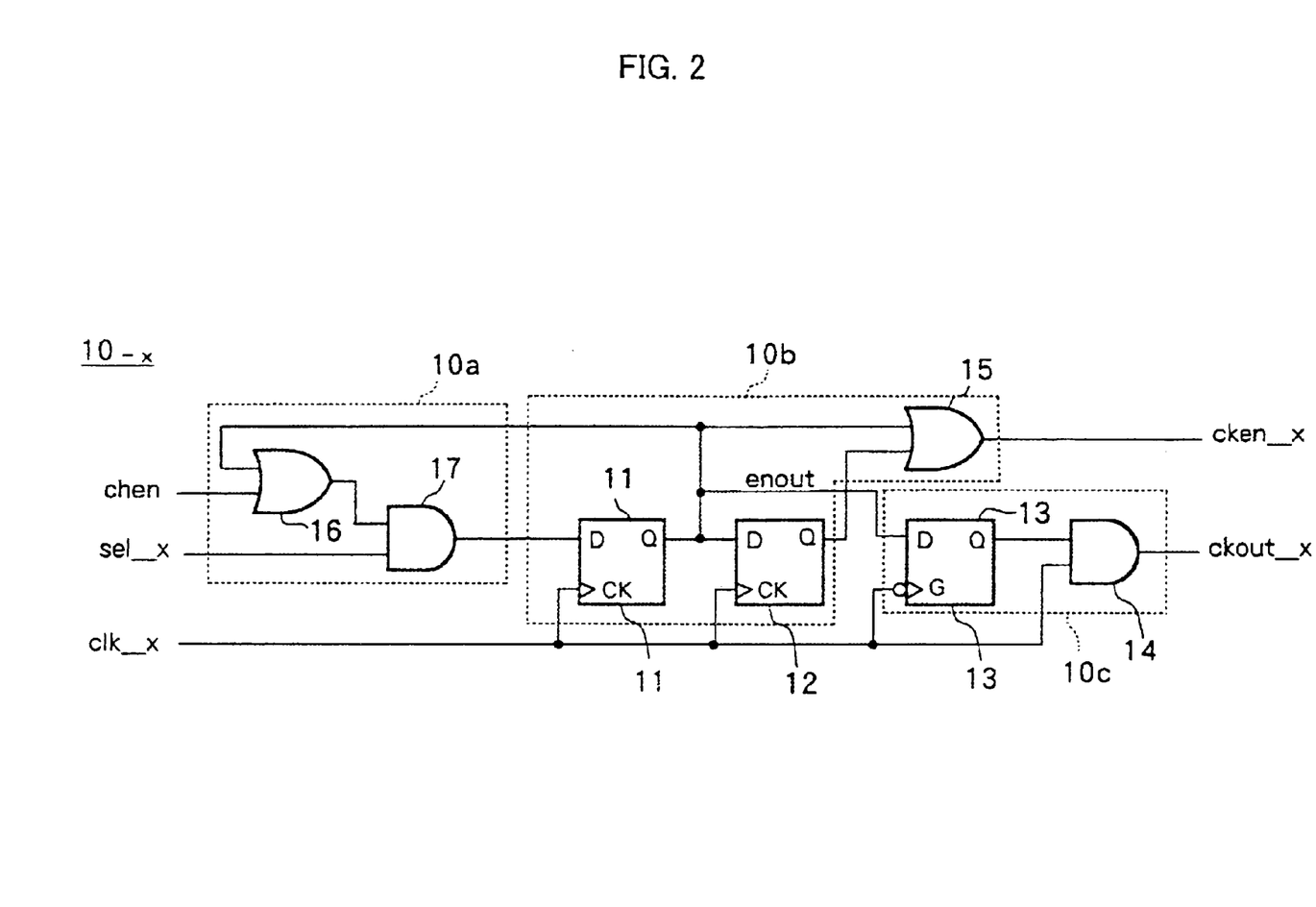
FIG. 2 is a circuit diagram of the configuration of a unit circuit in the first embodiment.

FIG. 2 shows the configuration of the unit circuits by taking the unit circuit 10-x for illustration.

The unit circuit 10-x, as explained above, receives the clock signal "clk_x", the selection signal "sel_x" which becomes active when the clock signal "clk_x" is selected and the clock supply enabling signal "chen" and outputs the selected clock signal "ckout_x" and the output condition monitor signal "cken_x".

The unit circuit 10-x comprises two flip-flops 11 and 12, a latch 13, two two-input OR gates 15 and 16 and two two-input AND gates 14 and 17.

One of input terminals in each of the OR gates 15 and 16 are mutually connected. The other input terminal of the OR gate 16 receives as an input the clock supply enabling signal "chen". An output terminal of the OR gate 16 is connected to one input terminal of the AND gate 17 and the other input terminal of the AND gate 17 receives as an input the selection signal "sel_x". An output terminal of the AND gate 17 is connected to a D-terminal of the flip-flop 11 and a Q-terminal of the flip-flop 11 is connected to a D-terminal of the flip-flop 12. A connection point of the Q-terminal of the flip-flop 11 and the D-terminal of the flip-flop 12 is connected to the mutually connected one input terminals of the OR gates 15 and 16 and a D-terminal of the latch 13. A Q-terminal of the flip-flop 12 is connected to the other input terminal of the OR gate 15, and an output terminal of the OR gate 15 outputs the monitor signal. "cken_x". A Q-terminal of the latch 13 is connected to one input terminal of the AND gate 14. The clock signal "clk_x" is input to clock input terminals CK of the flip-flops 11 and 12, an inverse G-terminal of the latch 13 and the other input terminal of the AND gate 14, and the output clock signal "ckout_x" is output from an output terminal of the AND gate 14.

The unit circuit 10-x illustrated in FIG. 2 is, when roughly divided, composed of a control input gate unit 10a, a delay unit 10b and a clock output gate unit 10c.

The control input gate unit 10a is a unit for controlling inputting of the clock supply enabling signal "chen" and the selection signal "sel_x" and comprises the OR gate 16 and the AND gate 17.

The delay unit 10b delays actual clock stopping from an instruction of clock stopping by at least exactly one clock cycle, delays actual starting of a clock supply from a clock supply approval by at least exactly one clock cycle, and comprises the two flip-flops 11 and 12 and the OR gate 15.

The clock output gate unit 10c comprises the latch 13 and the AND gate 14. In the clock output gate unit 10c, clock gating on a latch base is performed by the latch 13 and the AND gate 14 by using an output of the flip-flop 11 as an enabling signal "enout".

In the delay unit 10b, the monitor signal "cken_x" for a clock output condition is generated by the OR gate 15 by obtaining a logical sum of the output of the flip-flop 11 and the output of the flip-flop 12. When the selection signal "sel_x" input to the unit circuit 10-x shifts from a level indicating a selected state to a level indicating a non-selected state, after the output of the flip-flop 11 as the enabling signal "enout" of the clock gating becomes "L", the monitor signal "cken_" is shifted to "L" by being delayed exactly by one clock cycle. Due to this, continuation of a clock signal for at least one cycle is guaranteed from a reception of an instruction to stop the clock signal until an actual stopping of the clock signal.

In the control input gate unit 10a, logical sum is performed by the OR gate 16 on the output of the flip-flop 11 as the enabling signal "enout" of the clock gating and the clock supply enabling signal "chen". Furthermore, logical multiplication is performed by the AND gate 17 on a result of the logical sum with the selection signal "sel_x", and thereby, an input signal of the flip-flop 11 is generated.

Here, assuming that the clock signal "clk_x" is in a selected state, the selection signal "sel_x" is at "H" and an the input signal of the flip-flop 11 is at "H". At this time, when the clock signal "clk_x" is shifted from the selected state to the non-selected state, the selection signal "sel_x" shifts from "H" to "L" and the input signal of the flip-flop 11 shifts to "L". Rising of the next clock signal "clk_x" makes the flip-flop 11 operate, and an output signal thereof, that is, the enabling signal "enout" of the clock output gate unit 10c becomes "L". As a result, falling of the next clock "clk_x" makes the clock output gate unit 10c closed, so that clock supplying is stopped.

Inversely, when the clock signal "clk_x" is in the non-selected state first, since the selection signal "sel_x" is at "L", the input signal and output signal of the flip-flop 11 are both at "L". Therefore, one input level of the OR gate 16 is at "L" and the OR gate 16 is on standby until the clock supply enabling signal "chen" becomes "H". When the selection signal "sel_x" becomes "H" and the clock supply enabling signal "chen" becomes "H", the input signal of the flip-flop 11 shifts to "H". Rising of the next clock signal "clk_x" makes the flip-flop 11 operate, and an output signal thereof, that is the enabling signal "enout" of the clock output gate unit 10c becomes "H". As a result, falling of the next clock makes the clock output gate unit 10c closed and supplying of the clock starts.

As a result, at the time of switching the clock signals, a period is secured between stopping and starting of the clock signals wherein a supply line of the clock signal is kept stable at the "L" level. Since substantial switching of clock signals is performed during this period, generation of a hazard is prevented.

Below, the clock switching operation will be explained further in detail by using timing charts.

FIGS. 3A to 3J are timing charts of the clock switching operation in the first embodiment. FIGS. 3A to 3J show changes of waveforms at the time of an operation of switching from a first clock signal "clk_m" ($1 \leq m \leq x$) to a second clock signal "clk_n" ($1 \leq n \leq x$, $n \neq m$).

Figures 3A, 3B, 3C, 3D:
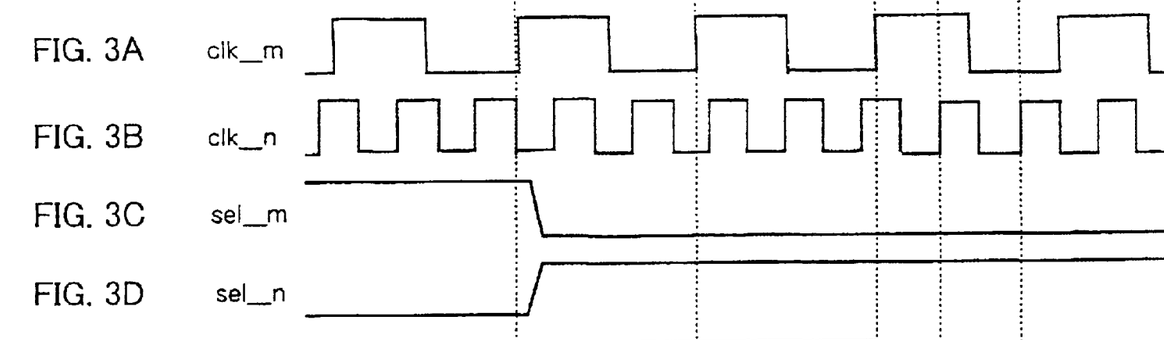

When the first clock signal "clk_m" is in a selected state, as shown in FIG. 3C, the selection signal "sel_m" is at the "H" level. At this time, in the unit circuit corresponding to the clock signal "clk_m", the input signal and output signal of the flip-flop 11 are both at "H", so that the enabling signal "enout" of the clock output gate unit 10c is at "H". Consequently, the same signal waveform as that of the clock signal "clk_m" is output as a clock signal "clkout_m" from the clock output gate unit 10c and output as an output clock signal "clkout" from the output circuit 20 (FIG. 3H and FIG. 3J).

On the other hand, all other selection signals including a selection signal "sel_n" of the second clock signal "clk_n" (FIG. 3D) are at the "L" level. Accordingly, all clock signals output from unit circuits other than the unit circuit corresponding to the clock signal "clk_m" are at the "L" level in the same way as the clock signal "clkout_n" shown in FIG. 3I.

Figures 3E, 3F:
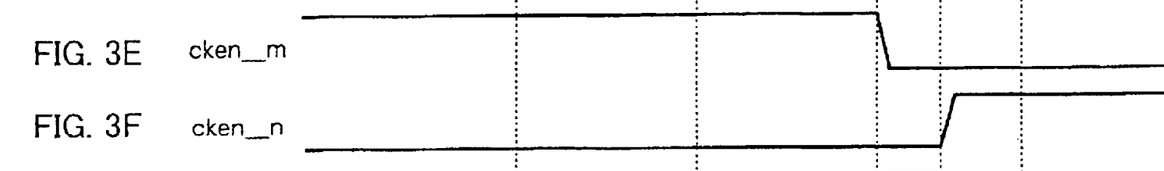
Figures 3G, 3H, 3I:
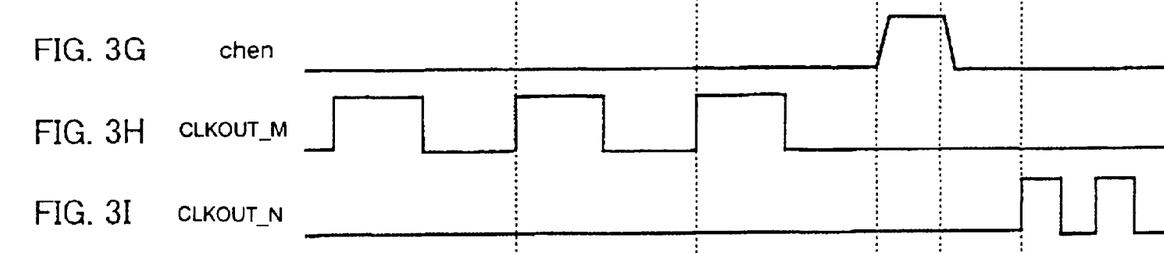
Figure 3J:
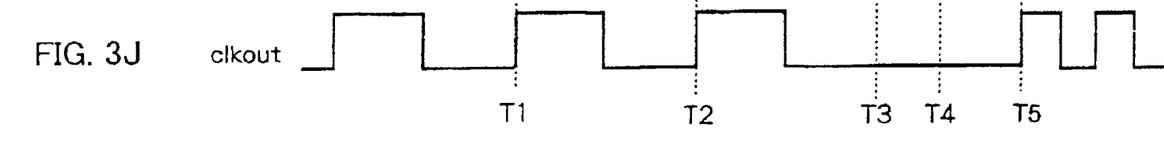

Since the monitor signals indicating output conditions of respective unit circuits are at the "H" level in "cken_m" shown in FIG. 3E and at the "L" level in "cken_n" shown in FIG. 3F, the clock supply enabling signal "chen" output from the feedback circuit 30 becomes the "L" level as shown in FIG. 3G.

Assuming that a request of clock switching is given at time T1, so that the selection signal "sel_m" is shifted from "H" to "L" and the selection signal "sel_n" is shifted from "L" to "H".

At this time, in the unit circuit 10-m corresponding to the clock signal "clk_m", an input signal of the flip-flop 11 shifts from the "H" level to "L" level due to an action of the AND gate 17. At the next time T2 which is rising of the clock pulse, an output signal of the flip-flop 11 becomes the "L" level. Furthermore, the clock output gate unit 10c is closed at timing of falling of the next clock, and outputting of the clock signal "clk_m" is stopped. As a result, voltage levels of the clock signals "clkout_m" and "clkout_n" shift to "L" and maintained as shown in FIG. 3H and FIG. 3J.

On the other hand, although the selection signal "sel_n" (FIG. 3D) of the clock signal "clk_n" shifts from the "L" level to "H" level, the enabling signal "enout" of the clock output gate unit 10c and the clock supply enabling signal "chen" (FIG. 3G) are both at the "L" level at this stage and the OR gate 16 does not operate, so that the AND gate 17 cannot operate, either. Consequently, the enabling signal "enout" of the clock output gate does not become active and, as shown in FIG. 3I, the clock signal "clkout_n" is not yet output from the unit circuit 10-n at this stage.

At time T3 when the second clock cycle comes after the instruction of stopping the clock signal "clk_m", the output of the flip-flop 12 becomes the "L" level and the stopping of the clock signal "clk_m" is detected by being delayed by one cycle. Namely, after passing the last one cycle of the clock signal "clkout_m" shown in FIG. 3H, the output of the OR gate 15, that is, the output condition monitor signal "cken_m" shifts to the "L" level. As a result, all of inputs of the feedback circuit (NOR gate) 30 become the "L" level and an output signal thereof, that is, the clock supply enabling signal "chen" shifts from the "L" level to the "H" level at the time T3 as shown in FIG. 3G.

When the clock supply enabling signal "chen" becomes "H", in the unit circuit 10-n corresponding to the clock signal "clk_n", the output of the OR gate 16 becomes the "H" level and the input signal of the flip-flop 11 becomes the "H" level. At time T4 which is rising of the next clock signal "clk_n", the output signal of the flip-flop 11, that is the enabling signal "enout" of the clock output gate unit 10c becomes the "H" level. Due to this, as shown in FIG. 3F and FIG. 3G, the monitor signal "cken_n" output from the OR gate 15 becomes "H" and the clock supply enabling signal "chen" becomes "L".

In the unit circuit 10-n corresponding to the clock signal "clk_n", the clock supply enabling signal "chen" applied to one input of the OR gate 16 becomes "L". On the other hand, the enabling signal "enout" of the clock output gate unit 10c is at "H" and the enabling signal "enout" is applied to the other input of the OR gate 16. Therefore, the input signal and output signal of the flip-flop 11 are both maintained at the "H" level.

At the next falling of the clock signal "clk_n", the clock output gate unit 10c opens, and after that, from the moment of time T5, the clock signal "clkout_n" is output from the unit circuit 10-n.

As a result of the above, as the clock signal "clkout" output from the output circuit (OR gate) 20, as shown in FIG. 3J, the first clock signal "clk_m" having been in a selected state stops completely at the time T3, kept at the "L" level from the time T3 to T5, then the second clock signal "clk_n" appears from the time T5.

In the clock switching method of the present embodiment, even if a clock switching instruction is given at time T1, a clock switching operation is not immediately performed. The clock switching instruction at time T1 functions as a trigger and stopping and supplying of the clock signals are delayed by the delay unit 10b to create a period from the time T3 to T5 when the potential of a clock output line is guaranteed to be the "L" level.

Specifically, only when start of stopping the clock signal "clk_m" is delayed until the time T2 and the fact that all clocks are in a stopped state is monitored at time T3, the clock supply enabling signal "chen" becomes "H". When the enabling signal "chen" becomes "H", an instruction is given to start supplying the clock signal "clk_n", an actual supply of which has been prohibited even if in a selected state. The period when the clock supply enabling signal "chen" is at the "H" level is a non-active state with the clock output gate unit 10c closed and the clock output line is always stable at the "L" level. Therefore, a hazard is not generated at the time of clock switching. Also, when the clock supply enabling signal "chen" shifts to the "L" level, on the condition of guaranteeing one clock cycle after that to be at the "L" level, a supply of the clock signal "clk_n" starts at the time T5. Thus, the period of supplying the clock signal "clk_n" never overlaps the actual clock switching period of T3 to T4.

According to the clock switching circuit in the first embodiment, a plurality of clock signals and the selection signals are input and a clock signal to be output can be selected in accordance with the selection signals. Therefore, by freely selecting a second clock signal "clk_n" from the plurality of clock signals, it is possible to switch an output clock signal from a first clock signal "clk_m" to the second clock signal "clk_n". At this time, by stopping by the clock output gate unit 10c outputting of the first clock signal "clk_m" which became non-selected, the switching operation of the clock signal can be performed in a state that the output clock signal line is stably at the "L" level.

At this time, the enabling signal "enout" of the clock output gate unit 10c becomes active and, when furthermore delayed by one clock cycle, shifts the level of the output condition monitor signal "cken_m" from "H" to "L". Consequently, timing of stopping the clock signal to become non-selected can be surely predicted.

Also, since supplying of the second clock signal "clk_n" starts by being delayed by at least one clock cycle from a clock switching operation, a plurality of clock signals do not become a selected state at a time.

As explained above, since a pulse of the clock signal is not applied at the time of switching and a hazard is not generated, an erroneous operation is effectively prevented. As a result, clocks can be switched without breaking an operation of an LSI, and a power consumption of the overall LSI can be reduced by switching to a clock with a required minimum frequency in accordance with kinds of tasks.

Also, the clock switching circuit in the first embodiment has the configuration that a plurality of same unit circuits corresponding to individual clock signals are arranged, a clock supply enabling signal "chen" is generated based on an output condition monitor signal "cken_i" (i=1 to x) for the unit circuits, and an enabling signal "enout" of a clock output gate from the enabling signal "chen" and the selection signal "sel_i" of the clock signal is generated. Therefore, only by changing the number of unit circuits in accordance with the number of clocks, the design can be easily modified, so that it can be a highly general clock switching circuit.

Second Embodiment

Figure 4:
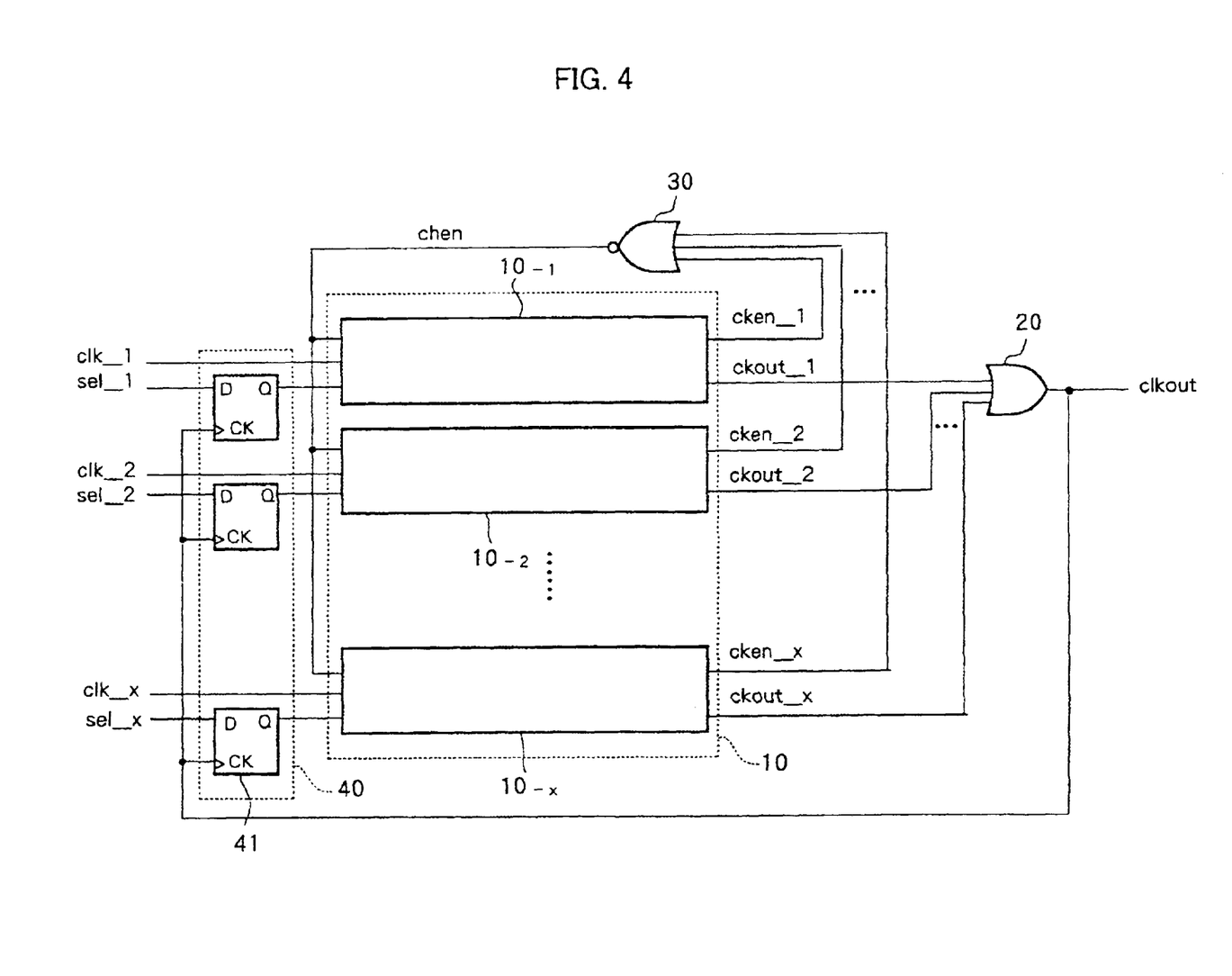
FIG. 4 is a block diagram of a clock switching circuit according to a second embodiment.

FIG. 4 is a block diagram of a clock switching circuit in a second embodiment.

In the clock switching circuit illustrated in FIG. 4, a synchronization circuit 40 is provided on the clock input side of the clock selection circuit 10. The configuration other than that is the same as in FIG. 1 relating to the first embodiment.

The synchronization circuit 40 comprises a plurality of flip-flops 41 provided to each of unit circuits 10-1 to 10-x composing the clock selection circuit 10. A D-terminal of the flip-flop 41 is applied any one of selection signals "sel_1" to "sel_x" and a Q-terminal of the flip-flop 41 is connected to an input of the AND gate 17 in a corresponding unit circuit. All of clock input terminals CK of the plurality of flip-flops 41 are connected to an output line of the output circuit 20. Due to this, the selection signals "sel_1" to "sel_x" are retrieved by the clock selection circuit 10 in synchronization with an output clock signal "clkout".

In the case of FIG. 3C, a slight deviation of timing (skew) that the selection signal "sel_m" shifts from the "H" level to "L" level sometimes causes overlapping of signal inputting to a clock input and the D-terminal of the flip-flop 11. In that case, metastable is caused and an output of the flip-flop 11 becomes unstable in some cases. Here, the metastable means, for example, in the case that a frequency of a clock signal is high, the state that the output level does not become completely the low level "L" nor high level "H" but becomes an intermediate level "M" even when the flip-flop is in a latch state. When the metastable occurs, the output of the flip-flop 11 becomes unstable, consequently, it is liable to cause an erroneous operation. The reason of synchronizing with the selection signals is to prevent an erroneous operation caused by a skew of the selection signals.

In the second embodiment, a plurality of flip-flops 41 are provided for synchronizing with the selection signals in order to prevent an erroneous operation caused by a skew and metastable as above. By operating the plurality of the flip-flips 41 synchronously with the output clock signal "clkout", the selection signals are latched once and output to the unit circuits at the same timing. Due to this, even when phases of the clock signals "clk_1", "clk_2", . . . "clk_x" to be selected are deviated, or even when an operation frequency is extremely high, furthermore, when the levels of the selection signals shift at any time, a stable operation of the clock switching circuit can be guaranteed.

Third Embodiment

Figure 5:
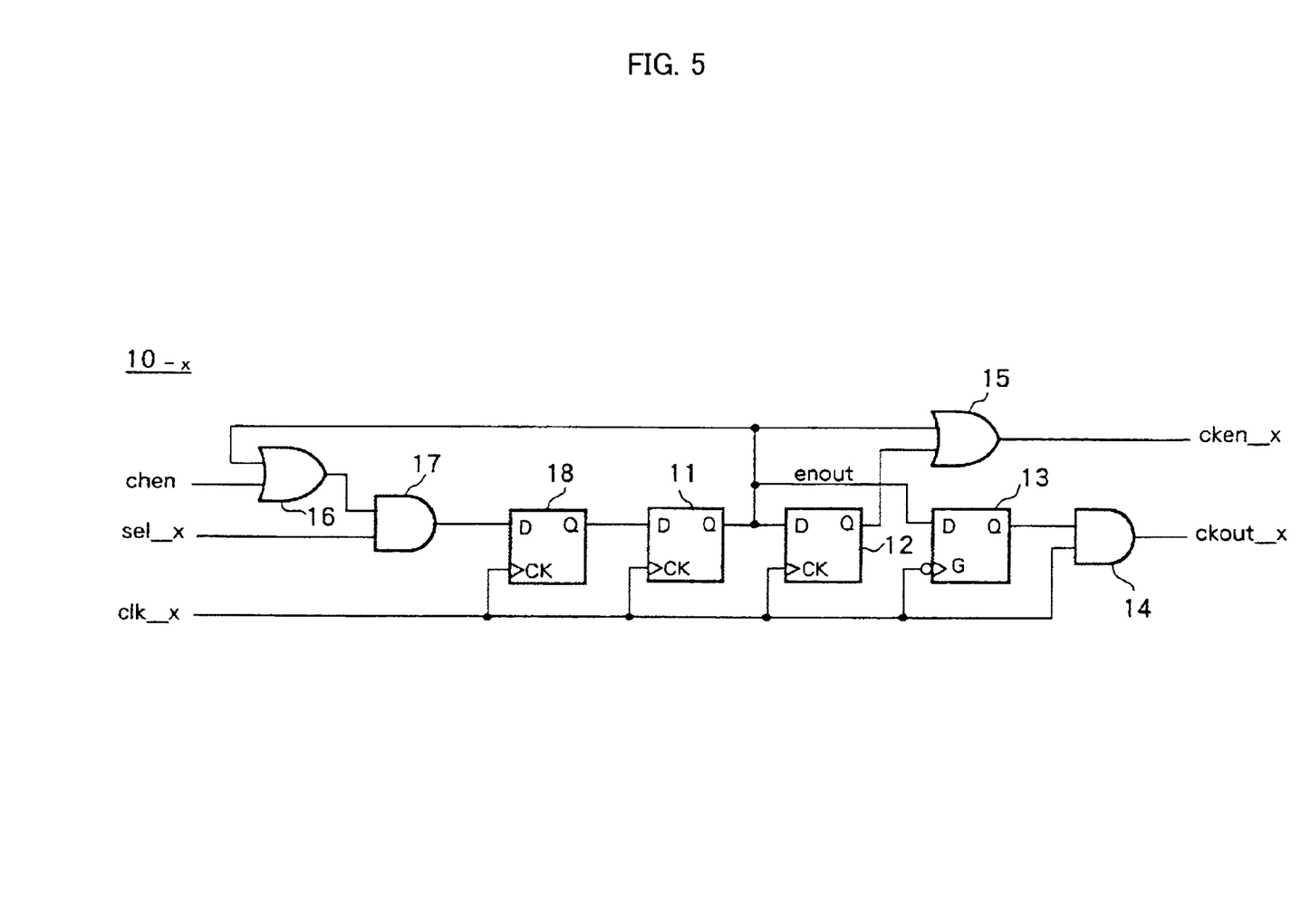
FIG. 5 is a circuit diagram of the configuration of a unit circuit in a third embodiment.

FIG. 5 is a circuit diagram of the configuration of a unit circuit in a third embodiment by taking the unit circuit 10-x for illustration.

In the unit circuit 10-x illustrated in FIG. 5, another flip-clop 18 is connected between the AND gate 17 and the flip-flop 11. The configuration other than that is the same as the unit circuit in the first embodiment illustrated in FIG. 2.

In a point that a role of the flip-flop 18 is to prevent erroneous operations caused by metastable and skew, the flip-flop 18 is the same as the flip-flop 41 in FIG. 4. However, the flip-flop 18 is different from the flip-flop 41 in a point that a signal to be taken a countermeasure is different and a point that it is connected at a subsequent stage of the AND gate 17.

Because of deviation of timing (skew) that the clock supply enabling signal "chen" output from the feedback circuit 30 shifts from the "L" level to the "H" level (time T4 in FIG. 3G), metastable occurs and the output of the flip-flop 11 becomes unstable, so that a timing of starting to supply the clock "clk_n" to be supplied next at the time T5 may be deviated.

In the third embodiment, a flip-flop 18 for synchronization with the clock supply enabling signal "chen" is provided for individual unit circuit so as to prevent erroneous operations caused by a skew and metastable as above. By operating the flip-flop 18 in synchronization with an input clock signal, for example "clk_n" in FIG. 3B, the enabling signal "chen" is once latched and output at a timing in synchronization with the flip-flop 11 at its subsequent stage. Due to this, even when phases of signals are deviated at the time of feedback, or even when the operation frequency is extremely high, a stable operation of the clock switching circuit can be guaranteed.

Note that it is preferable to combine adding of the synchronization portions (flip-flop 18) in the third embodiment and adding of the synchronization portions (flip-flop 41) in the second embodiment for a more stable operation.

Fourth Embodiment

In the above first to third embodiments, by using the multiple input OR gate 20 as an output circuit and obtaining a logical sum of clock signals "ckout_1" to "ckout_x" from the respective unit circuits, the final output clock signal "clkout" was generated.

The fourth embodiment relates to a modification of the output circuit at the final stage.

Figure 6:
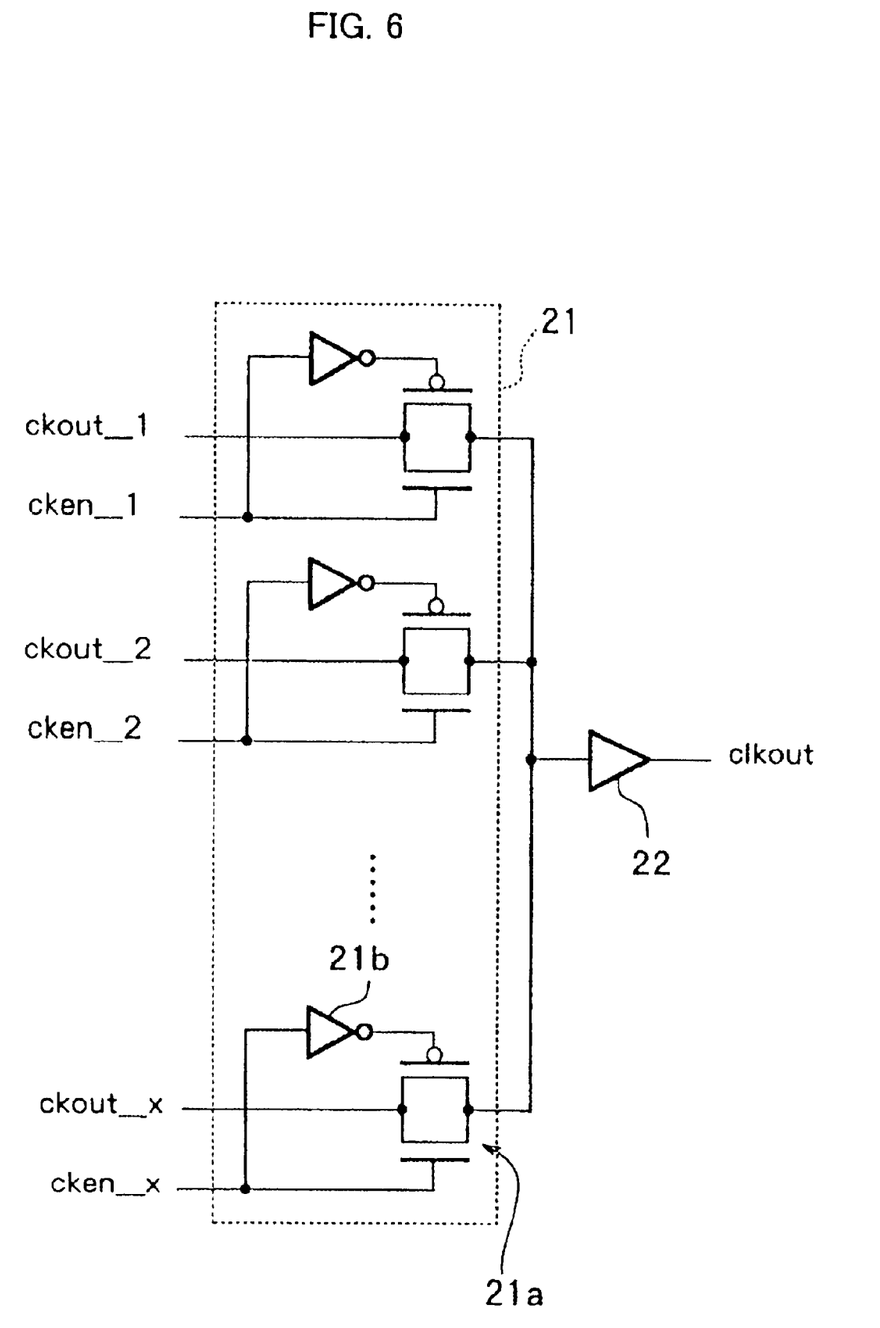
FIG. 6 is a circuit diagram of an output circuit in a fourth embodiment.

FIG. 6 is a circuit diagram of an output circuit in the fourth embodiment.

The output circuit illustrated in FIG. 6 comprises a multiplexer 21 using a transmission gate and a buffer 22. The multiplexer 21 comprises a plurality of transmission gates 21a for controlling transmission and cutoff of clock signals "ckout_i" (i=1, 2, ..., x) output from the respectively corresponding unit circuits. The transmission gate 21 comprises a PMOS transistor and an NMOS transistor, sources of which are connected and drains of which are connected. The NMOS transistor is controlled by a respectively corresponding monitor signal "chen_i", and the PMOS transistor is controlled by a signal obtained by inverting the monitor signal "cken_i" by an inverter 21b. Outputs of the plurality of transmission gates 21a are connected to an input of the buffer 22, and an output clock signal "ckout" is taken out from an output of the buffer 22.

The output circuit shown in FIG. 6 has an advantage of outputting a clock signal at a high speed, because the monitor signal "cken_i" turns on only one transmission gate which has become the "H" level among the plurality of transmission gates 21a at operation.

Figure 7:
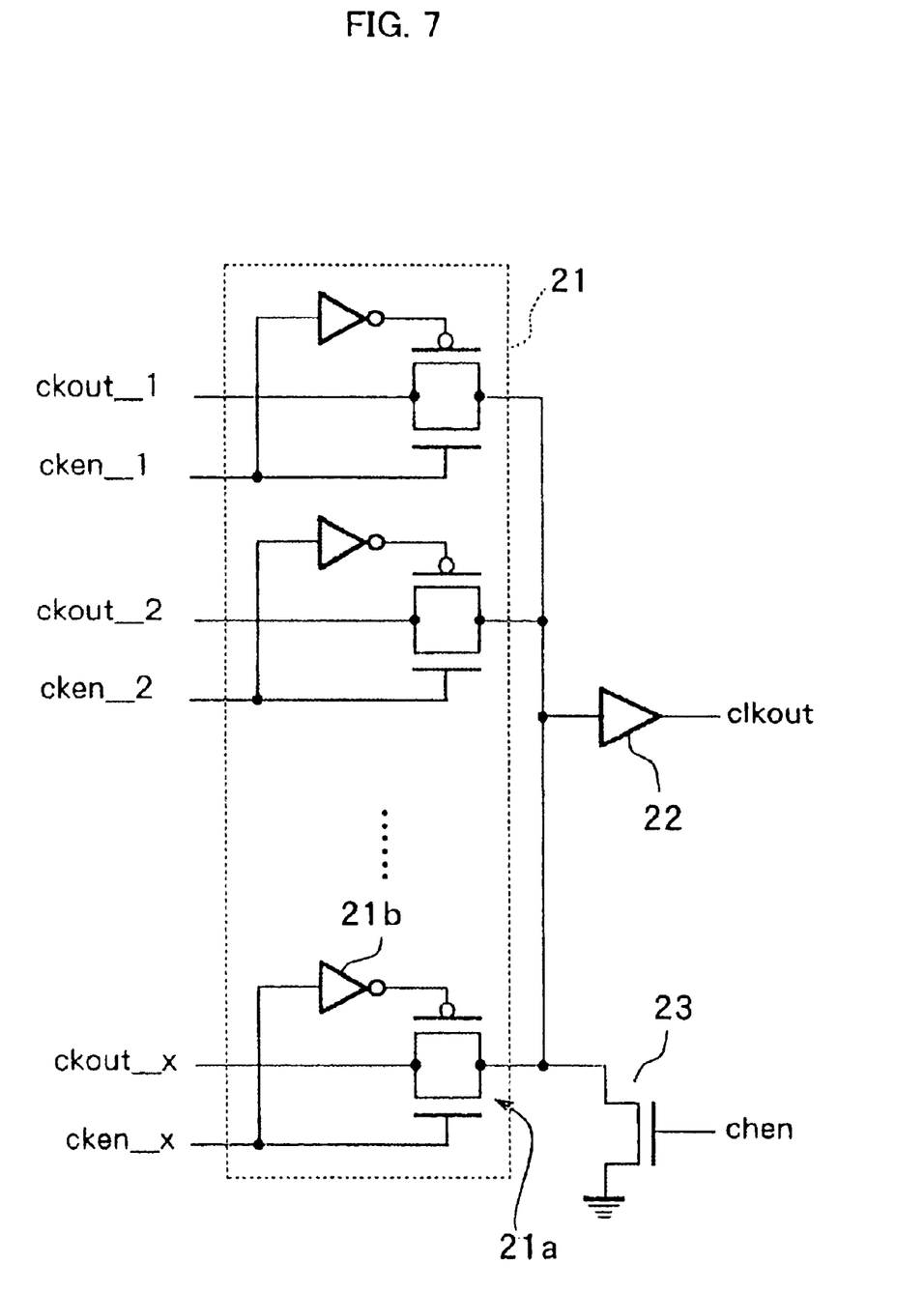
FIG. 7 is a circuit diagram of another configuration example of the output circuit in the fourth embodiment.

FIG. 7 is a circuit diagram of another configuration example of the output circuit in the fourth embodiment.

In the output circuit illustrated in FIG. 7, a discharge device 23, for example, an NMOS transistor whose gate is controlled by the clock supply enabling signal "chen" is provided between an output node of a transmission gate 21a and a supply line at the ground potential. The configuration other than that is the same as that in the output circuit illustrated in FIG. 6.

Since all of transmission gates 21a turn off at the time of a clock switching operation, an input of a buffer 22 becomes high impedance only during that period. It is considered that it does not cause any problems because the period is limited and short. Note that although it is a short period, it is not very preferable that an output node becomes an electrically floating state.

Therefore, in the output circuit illustrated in FIG. 7, the discharge device 23 is turned on only for a short period of time (a period from T3 to T4 in FIG. 3) by using the clock supply enabling signal "chen".

Consequently, an input node of the buffer 22 is fixed at a ground potential at the time of clock switching and no noise is superimposed on this node, so that an output potential becomes more stable.

According to the clock switching circuit according to the present invention, at the time of an actual operation of switching a first clock signal to a second clock signal, an output stop period wherein outputting of the first clock signal is stopped and supplying of the second signal is not started yet is surely secured. Therefore, a hazard is not generated and an erroneous operation is effectively prevented.

What is claimed is:

1. A clock switching circuit for receiving as an input a plurality of clock signals including a first clock signal and a second clock signal and switching an output clock signal to be output from said first clock signal to said second clock signal, comprising:

a plurality of unit circuits for respectively receiving as an input at least said first and said second clock signals, associated selection signals of the first and second clock signals, and an enabling signal controlling supplying and stopping of said first and second clock signals in accordance with said selection signals and said enabling signal;

a feedback circuit for monitoring output conditions of said plurality of unit circuits and, when outputting of all clock signals of said plurality of unit circuits is stopped as a result of stopping said first clock signal, providing said enabling signal to the plurality of said unit circuits enabling starting of a supply of said second clock signal; and an output circuit at a final stage connected to all outputs of said plurality of unit circuits for outputting any one of said plurality of clock signals output from said plurality of unit circuits; and wherein said output circuit at the final stage comprises a discharge portion for discharging an output side node of the output circuit in accordance with said enabling signal.

2. The clock switching circuit as set forth in claim 1, wherein each of said plurality of unit circuits comprises a delay unit for delaying timing of changing a voltage level indicating a supplying condition of said first clock signal to a voltage level indicating a stopping condition of a monitor signal used for monitoring said output condition when an instruction of stopping said first clock signal is given by said selection signal, and delaying an operation of starting a supply of the second clock signal by using a point that said enabling signal becomes active as a starting point when an instruction of starting a supply of said second clock signal is given by said selection signal.

3. The clock switching circuit as set forth in claim 2, wherein:

each of said plurality of unit circuits further comprises a clock output gate unit, whose operation timing is controlled by said delay unit, for stopping or starting outputting of said clock signal; and said delay unit and said clock output gate unit operate in synchronization with said clock signal.

4. The clock switching circuit as set forth in claim 2, wherein:

said delay unit operates in synchronization with said clock signal, and further comprising a synchronization portion provided at an input stage of said delay unit in each of said plurality of unit circuits for operating in synchronizing with said clock signal.

5. The clock switching circuit as set forth in claim 1, further comprising:

a plurality of synchronization portions provided at an input stage for said selection signal in each of said plurality of unit circuits for operating in synchronization with a clock signal output from said output circuit to unify phases of said selection signals of said plurality of unit circuits.

6. The clock switching circuit as set forth in claim 1, wherein said first clock signal and said second clock signal are included in said plurality of clock signals as said input.

7. The clock switching circuit as set forth in claim 1, wherein said first clock signal and said second clock signal are selected from said plurality of clock signals.

8. The clock switching circuit as set forth in claim 1, wherein said first clock signal and said second clock signal have different frequencies and phases, said switching occurring while preventing generation of a hazard.

9. The clock switching circuit as set forth in claim 1, wherein said plurality of clock signals includes signals having different frequencies and phases.

10. A clock switching circuit, comprising:

a plurality of unit circuits receiving as an input at least first and second clock signals, associated selection signals of the first and second clock signals, and an enabling signal controlling supplying and stopping of said first and second clock signals in accordance with said selection signals and said enabling signal wherein each of said plurality of unit circuits comprises a delay unit clocked by respective clock signal for delaying timing of changing a voltage level indicating a supplying condition of said first clock signal to a voltage level indicating a stopping condition of a monitor signal used for monitoring the output condition of said unit circuit when an instruction of stopping said first clock signal is given by said selection signal, and delaying an operation of starting a supply of the second clock signal by using a point that said enabling signal becomes active as a starting point when an instruction of starting a supply of said second clock signal is given by said selection signal;

means for monitoring the output conditions of said plurality of unit circuits and, when outputting of all clock signals of said plurality of unit circuits is stopped as a result of stopping said first clock signal, providing said enabling signal to said plurality of said unit circuits enabling starting of a supply of said second clock signal; and an output circuit at a final stage connected to all outputs of said plurality of unit circuits for outputting any one of said plurality of clock signals output from said plurality of unit circuits.

11. The clock switching circuit as set forth in claim 10, wherein said output circuit at the final stage comprises a discharge portion for discharging an output side node of the output circuit in accordance with said enabling signal.

12. The clock switching circuit as set forth in claim 10, wherein:

each of said plurality of unit circuits further comprises a clock output gate unit, whose operation timing is controlled by said delay unit, for stopping or starting outputting of said clock signal; and said delay unit and said clock output gate unit operate in synchronization with said clock signal.

13. The clock switching circuit as set forth in claim 10, further comprising:

a plurality of synchronization portions provided at an input stage for said selection signal in each of said plurality of unit circuits for operating in synchronization with a clock signal output from said output circuit to unify phases of said selection signals of said plurality of unit circuits.

14. The clock switching circuit as set forth in claim 10, wherein:

said delay unit operates in synchronization with said clock signal, and further comprising a synchronization portion provided at an input stage of said delay unit in each of said plurality of unit circuits for operating in synchronizing with said clock signal.

15. The clock switching circuit as set forth in claim 10, wherein said first clock signal and said second clock signal are included in said plurality of clock signals as said input.

16. The clock switching circuit as set forth in claim 10, wherein said first clock signal and said second clock signal are selected from said plurality of clock signals.

17. The clock switching circuit as set forth in claim 10, wherein said first clock signal and said second clock signal have different frequencies and phases, said switching occurring while preventing generation of a hazard.

18. The clock switching circuit as set forth in claim 10, wherein said plurality of clock signals includes signals having different frequencies and phases.

19. The clock switching circuit as set forth in claim 10 wherein said delay unit delay clock stopping from an instruction for clock stopping by a predetermined clock cycle and clock starting of a clock supply another predetermined clock cycle.

* * * * *

UNITED STATES PATENT AND TRADEMARK OFFICE
CERTIFICATE OF CORRECTION

PATENT NO. : 6,801,074 B2  Page 1 of 1
APPLICATION NO. : 10/618726
DATED : October 5, 2004
INVENTOR(S) : Tetsumasa Meguro It is certified that error appears in the above-identified patent and that said Letters Patent is hereby corrected as shown below:

Column 12

Line 37, "delay clock" should read -- delays clock --.

Signed and Sealed this

Eighth Day of January, 2008

JON W. DUDAS
*Director of the United States Patent and Trademark Office*